H. E. AINE.
METHOD FOR CONSTRUCTING SPIRALLY WIRE WOUND STRUCTURES OF THE CONTINUOUS WOODEN STAVE TYPE.
APPLICATION FILED APR. 29, 1912.
1,082,062.
Patented Dec. 23, 1913.
2 SHEETS—SHEET 2.
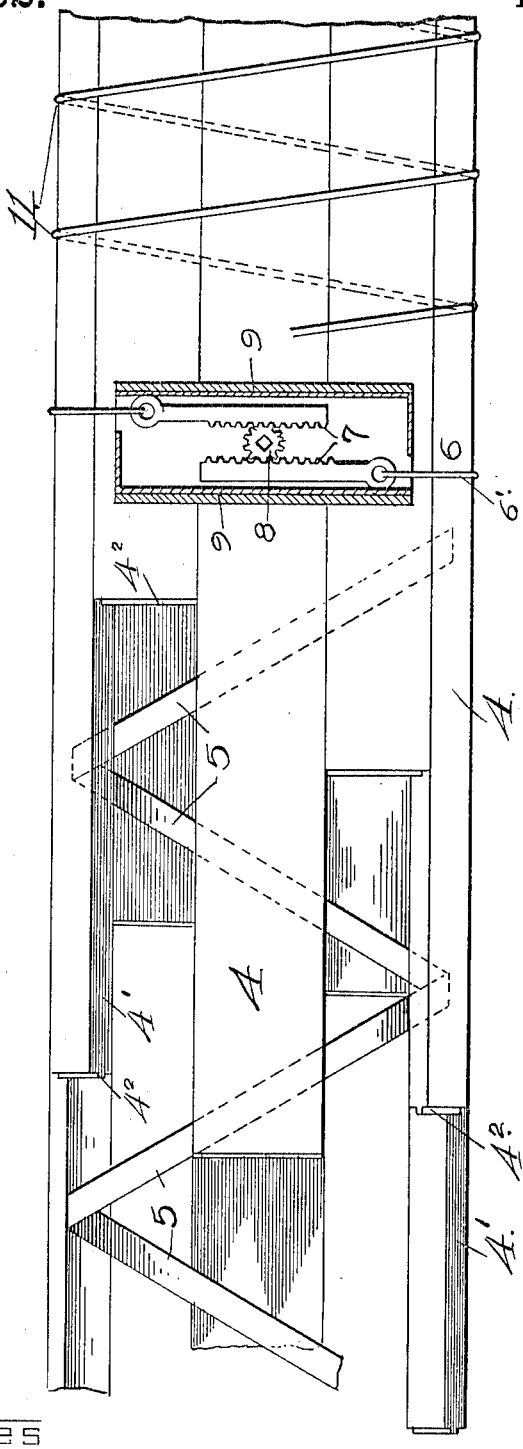
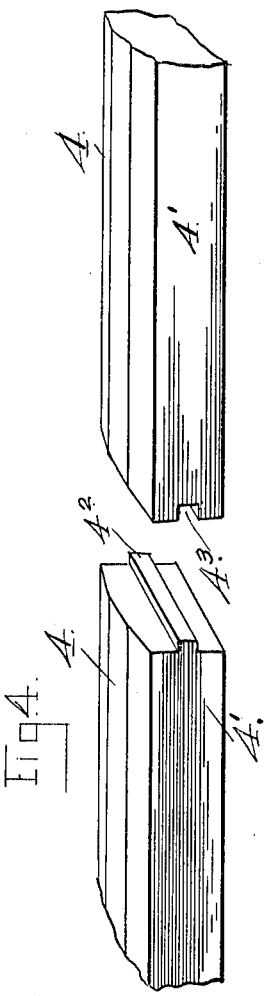
Witnesses
Arthur L. Slee
Harry H. Totten.
Inventor
Harry E. Aine

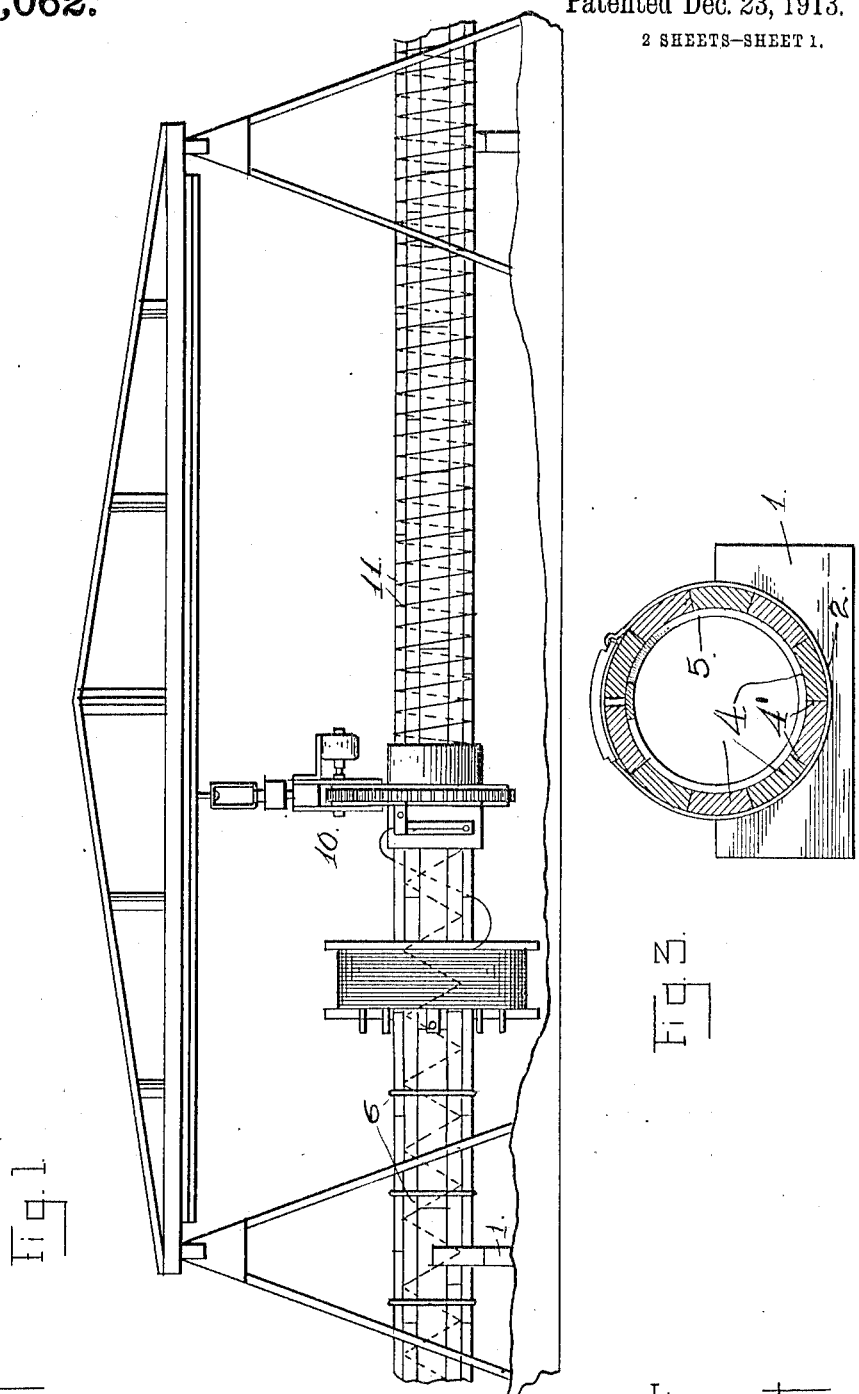

UNITED STATES PATENT OFFICE.

HARRY E. AINE, OF RICHMOND, CALIFORNIA.

METHOD FOR CONSTRUCTING SPIRALLY-WIRE-WOUND STRUCTURES OF THE CONTINUOUS-WOODEN-STAVE TYPE.

1,082,062.  Specification of Letters Patent.  Patented Dec. 23, 1913.

Application filed April 29, 1912. Serial No. 693,779.

*To all whom it may concern:*

Be it known that I, HARRY E. AINE, a citizen of the United States, residing at Richmond, in the county of Contra Costa and State of California, have invented certain new and useful Improvements in Methods for Constructing Spirally - Wire - Wound Structures of the Continuous-Wooden-Stave Type, of which the following is a specification.

The hereinafter described invention relates to improvements in stave pipe and more particularly to spirally wire wound, continuous wooden stave pipe and the method for constructing the same, and has for its principal object to provide a wooden pipe for the conducting of fluids, in which the meeting butt joints of the various staves are arranged in staggered relation to each other, and in which the edges of the staves are retained together forming a cylindrical structure by an endless wrapping of wire, whereby an endless pipe is provided which is capable of being constructed in the ditch or at the place where it is to be used.

Another object is to provide a pipe of the continuous stave character, in which the use of separate, independently adjustable, strap bolts which encircle the same at spaced intervals are dispensed with, and an endless spiral winding of suitable wire is provided, surrounding the pipe for its entire length, whereby the pipe is reinforced both circumferentially and longitudinally.

Further and important objects are to provide a pipe of the above character which is inexpensively and rapidly constructed, capable of being laid simultaneously as it is constructed, thoroughly efficient for the purposes designed and equally braced circumferentially and longitudinally throughout its entire length.

With the above mentioned and other objects in view, the invention consists in the construction and novel combination of parts hereinafter fully described, illustrated in the accompanying drawings and pointed out in the claims hereto appended.

In the drawings—Figure 1 is a side elevation of a portion of my improved pipe, disclosing a portion of the same being spirally wound, the clamps for retaining the assembled staves in position before being permanently secured together, the wire core for supporting certain of the staves while the same are being assembled, the cradles for supporting certain other of the staves while the same are being assembled, and the mechanism for spirally winding the pipe with a suitable binding wire. Fig. 2 is an enlarged elevation of a portion of my improved pipe in the course of construction, disclosing a portion of it completely formed, a portion temporarily clamped together and a portion of it in the process of formation about the spiral spring core, the cradles for supporting the same and the staggered arrangement of the butt joints of the staves. Fig. 3 is an end sectional view, disclosing one of the cradles in which the lower section of the pipe is formed, the wire core, and the upper sections of the pipe resting thereon before the sections are united by the temporary clamps. Fig. 4 is a perspective view of an end of one pair of the staves disclosing the shape thereof and the tongues and grooves carried thereby.

Referring more particularly to the drawings, the reference numeral 1 designates one of the cradles for supporting the pipe as it is constructed, and in the concave central portion 2 of which is adapted to be positioned, with their side edges in meeting relation, the various stave sections 4 forming the bottom one-half section of the pipe, with the ends of the staves in staggered relation to each other. A core or mandrel 5 preferably formed from suitable spirally wound wire is now seated in the one-half formed section of the pipe and provides a support for the staves 4 forming the top one-half section of the pipe. The core or mandrel 5 when constructed of spirally wound wire is of a diameter slightly larger than the inside diameter of the pipe to be constructed, and of a length approximately the same as the average stave to be used, and it will be observed that the core being seated in the bottom formed section and the staves forming the top half section being seated thereon, the same will be supported loosely with the beveled side edges 4' in a position to be uniformly clamped together. While I have illustrated the core or mandrel 5 as being composed of spirally wound wire, it is obvious that the same may be constructed in any other manner desired and of any length, just so long as it will serve the purpose of supporting and retaining the staves built up around the same. After the pipe is in the above semi-formed condition, the edges of the staves are tightly forced against each other by suitably spaced temporary clamps 6 which encircle the pipe and each of which consists of a flexible cable 6' carrying on each end suitable racks 7, which intermesh with a rotatable pinion 8 mounted in a suitable housing 9, and adapted to be operated by a suitable crank or key, not shown. As the semi-formed sections are temporarily clamped together, the core 5 is moved longitudinally of the pipe to such a point where it is required to support the stave sections forming the top one-half of the advanced pipe. In moving the core, it is only necessary to grasp one end of it and pull the same longitudinally of the pipe, the action on the remaining coils of the core lengthening the same, reducing its diameter, and permitting the same to slide freely within the pipe. The butt ends of the staves 4 are provided on their opposing ends with integral projecting tongues 4² which project into grooves 4³ in the ends of the adjoining staves and from this construction it will be observed that as the pipe is constructed the abutting ends of the staves are secured together to prevent warping of the same. After a sufficient length of the pipe is assembled and retained in position by the temporary clamps 6 my improved pipe-winding machine, described in Letters Patent No. 1,006,173 granted Oct. 17, 1911, designated by the numeral 10 is placed on the pipe and the staves are permanently secured together by a spiral winding of wire 11, the wrappings of the same being uniformly spaced apart around the outer periphery of the pipe and the same extend in an unbroken series for the full length of the pipe. As the machine 10 is advanced, the temporary clamps are removed and the staves previously held together in this manner are now permanently secured together by a wrapping of wire, thus providing a pipe which is uniformly reinforced throughout its entire length.

It will be observed from my new method of constructing pipe it is only necessary to mill the necessary staves at a nearby mill, then pack these into a compact mass and transport the same to the place where the pipe is to be constructed and as the pipe is assembled the individual staves are assembled without regard to their length, care being taken that the adjacent abutting joints do not coincide, but are arranged in staggered relation to each other. As it is not necessary to cut the individual staves to any particular length, a great saving of material is made, and a jointless, continuous stave, spirally wire wrapped pipe, which will not become disconnected, or become leaky through changes of weather conditions or through unreasonable ditch alinement and which is reinforced circumferentially and longitudinally throughout its full length has been provided.

Having thus fully described my invention what is claimed as new and desired to be protected by Letters Patent is—

1. The method of constructing endless pipe of the continuous stave type, consisting of assembling the staves forming the lower one-half section in a cradle with their ends in staggered relation, positioning a flexible core of a diameter slightly larger than the pipe to be constructed in said lower one-half formed section, assembling the staves forming the upper one-half section around the upper portion of said flexible core with their ends in staggered relation, forcing the meeting edges of the staves into engagement with each other by a temporary clamping means surrounding the pipe, withdrawing the core longitudinally of said formed pipe to an incomplete portion thereof and forming the same as described, successively removing said temporary clamping means and encircling said pipe with a continuous spiral winding of wire for permanently securing said staves together.

2. The method of constructing an endless cylindrical structure of the wooden stave type, consisting of assembling the staves forming the lower one-half section in a cradle with their ends in staggered relation around a core or mandrel, assembling the staves forming the upper one-half section around the upper portion of said core or mandrel with their ends in staggered relation, forcing the meeting edges of the staves into engagement with each other by a temporary clamping means surrounding the structure, successively removing said temporary clamping means, and encircling said cylindrical structure with a continuous spiral winding of wire.

In testimony whereof I have signed my name to this specification in the presence of two subscribing witnesses.

HARRY E. AINE.

Witnesses:
  D. B. RICHARDS,
  HARRY G. TOTTEN.

---

Copies of this patent may be obtained for five cents each, by addressing the "Commissioner of Patents, Washington, D. C."